United States Patent
Filee et al.

(10) Patent No.: US 8,341,389 B2
(45) Date of Patent: Dec. 25, 2012

(54) DEVICE, SYSTEMS, AND METHOD FOR SECURELY STARTING UP A COMPUTER INSTALLATION

(76) Inventors: Alain Filee, Villa de Chennevièxes (FR); René Martin, Rue Gometz (FR)

( * ) Notice: Subject to any disclaimer, the term of this patent is extended or adjusted under 35 U.S.C. 154(b) by 895 days.

(21) Appl. No.: 12/319,444

(22) Filed: Jan. 7, 2009

(65) Prior Publication Data

US 2009/0265536 A1    Oct. 22, 2009

(30) Foreign Application Priority Data

Jan. 7, 2008  (FR) ..................... 08 00076

(51) Int. Cl.
*G06F 9/00*    (2006.01)
*G06F 15/177*    (2006.01)

(52) U.S. Cl. ............... 713/2; 713/1; 713/189; 713/182; 713/183; 713/184; 713/192; 713/193; 726/1; 726/16; 726/20; 726/21; 705/905; 709/208; 711/111

(58) Field of Classification Search .................. 713/189
See application file for complete search history.

(56) References Cited

U.S. PATENT DOCUMENTS

| | | | |
|---|---|---|---|
| 5,892,902 A | 4/1999 | Clark | |
| 6,654,797 B1 * | 11/2003 | Kamper | 709/220 |
| 8,060,735 B2 * | 11/2011 | Madjlessi | 713/1 |
| 2003/0014636 A1 * | 1/2003 | Ahlbrand | 713/176 |
| 2005/0055566 A1 | 3/2005 | Huang | |
| 2005/0136979 A1 * | 6/2005 | Dietl et al. | 455/558 |
| 2005/0182952 A1 | 8/2005 | Shinozaki | 713/189 |
| 2007/0053375 A1 * | 3/2007 | Kurosawa | 370/450 |
| 2007/0061561 A1 * | 3/2007 | Hashiguchi | 713/2 |

FOREIGN PATENT DOCUMENTS

FR    EP1850259 A2    10/2007

* cited by examiner

*Primary Examiner* — Nathan Flynn
*Assistant Examiner* — Bryan Wright

(57) ABSTRACT

A device for the secured start-up of a computer installation comprising a first connection interface to the computer installation and a second connection interface to an external data medium unit separate from the computer installation and which contains data and executable codes for a start-up program of the computer installation. The device also includes means for securing the use of data and executable codes and for transmitting data and executable codes of the start-up program from the external data medium unit via the second connection interface to the computer installation via the first connection interface, and after executing the means of security, to start-up the computer installation using transmitted executable codes and data.

14 Claims, 4 Drawing Sheets

DEVICE, SYSTEMS, AND METHOD FOR SECURELY STARTING UP A COMPUTER INSTALLATION

BACKGROUND OF THE INVENTION

A computer installation generally includes at least one internal hard disk device and a motherboard fitted with a microprocessor and memory typically of the RAM ("Random Access Memory") type for the purpose of executing computer programs stored notably on the internal hard disk device. The microprocessor is adapted to executing a start-up program which "boots" or starts up the computer installation, most typically the boot instructions to start and run an operating system. A hard disk device of the computer installation typically stores such a start-up program which is associated with a predetermined operating system. A start-up program may also be made available on an external data medium unit, such as a CD-ROM (Compact Disk Read Only Memory) provided with the computer installation when the computer installation includes a corresponding CD-ROM drive, or via another type of medium that can be connected to the computer installation, via a USB (Universal Serial Bus) type port for example.

A first level of start-up strategy applied by the microprocessor can also be defined in a Basic Input/Output System, commonly called BIOS, which is contained in a read-only memory ("ROM") located on the motherboard. The BIOS can thus establish or provide for a hierarchy for the start-up operation. One such hierarchy as an example would give priority to the CD-ROM start-up program, if it is properly positioned in the computer installation's CD-ROM drive and if its start-up program is ready to be executed, and then if the start-up program on the CD-ROM drive is not ready to be executed give second priority to the start-up program on another medium for example on a USB port of the computer installation and if its start-up program is ready to be executed, and then in third priority or by default to a start-up program stored on the internal hard disk. It may also be an option for the user to choose a desired operating system, or the location of a desired operating system from a menu presented to the user early in the boot or start-up.

It is an advantage to make the start-up of the computer installation secure. A method for a secured start-up of a computer installation is described in the patent application published under the number US 20060236122. This method consists, in its general principle, of verifying the integrity of a program before executing it using a cryptographic or encryption/decryption algorithm.

The microprocessor on the motherboard executes the cryptographic or encryption/decryption algorithm using a system of keys stored locally in a secured manner, such as on the internal hard disk device. Specifically, this method can be implemented to verify the integrity of the BIOS or part of the BIOS, a start-up program or part of such a program, such as, for example, the kernel of the operating system executed at start-up.

One advantage of this method is to enable the microprocessor of the motherboard of the computer installation to secure the execution of programs that might not be certified beforehand by a recognized certification authority. However, this imposes a constraint on the computer installation, which must locally and securely store a system of cryptographic keys, or possibly even several systems of keys, if necessary, that are particular if different programs require different security mechanisms.

This is an issue especially when a single or the same computer installation may be used by several people or users. Each user may want to define his or her own working environment as might be associated with specific applications. Another known solution, and that which may be added to the aforementioned solution, is to define authentication data specific for each user, to store it locally in a secured manner, and to proceed with a verification performed by the microprocessor to utilizing the stored authentication data during a step in the start-up procedure, for example immediately after the operating system starts. Again, there is a constraint in that the computer installation manages the authentication and furthermore, for the sake of simplicity, the users therefore would typically be required to use the same operating system although they can subsequently customize their work environment.

It may therefore be desirable to provide a device and/or a method of secured start-up of a computer installation that can overcome these types of constraints.

BRIEF SUMMARY OF THE INVENTION

The present invention in an illustrated embodiment is a device for secured start-up of a computer installation. In another aspect of the illustrated embodiment a method for securely starting up a computer system and any corresponding systems is disclosed.

The purpose of the invention is therefore a device for securely starting up a computer installation, characterized in that it includes:
- a first connection interface to the computer installation,
- a second connection interface to an external data medium unit, this medium being separate from the computer installation and including data and executable codes of a start-up program of the computer installation,
- cryptographic means for securing a use of the data and executable codes, and
- means for transmitting the data and executable codes of the start-up program from the external data device via the second connection interface to the computer system via the first connection interface, after execution of the means for securing for the start-up the computer installation using the transmitted data and executable codes.

Thus, it is sufficient for the BIOS of the computer installation, in its start-up strategy, to provide for the verification of the connection of the start-up device to the computer installation so that the computer installation itself is responsible for securing a use of the data and executable codes, enabling the data and executable codes of a particular or specific start-up program that must then be executed by the microprocessor of the motherboard of the computer installation.

Optionally, the means of securing comprise means for verifying and validating access rights, and for executing a method of authentication of a user of the external data medium unit.

Optionally, in this case, a device for securely starting up a computer installation according to the invention comprises means for securing and/or means for secured storage of access rights data, the verification and validation using the stored access rights data.

Optionally, the means of securing includes means for securing by encryption and/or decryption the data and executable codes of the start-up program.

Optionally, the means of securing includes means for executing a method for verifying the integrity of the data and executable codes of the start-up program.

Optionally, the means of security includes means for executing a method for decrypting the data and executable codes of the start-up program.

The purpose of the invention is also to provide a computer system with a secured start-up system comprising a secured start-up device constructed according to the teachings of the present invention and an external data medium, separate from the computer installation and comprising the data and executable codes of a start-up program of the computer installation, connected to the secured start-up device via the second connection interface.

Optionally, the first connection interface is an access point to a digital data transmission bus of the computer installation.

The purpose of the invention is also to provide a computer system with a secured start-up system, comprising a computer installation, a secured start-up device constructed according to the teachings of the present invention, and an external data medium unit, separate from the computer installation and containing the data and executable codes of a start-up program of the computer installation, and that is connected to the secured start-up device via the second connection interface.

Optionally, the second connection interface is an access point to a digital data transmission bus of the external data medium unit.

The purpose of the invention is also to provide a computer system with a secured start-up comprising a computer installation, an external data medium unit, separate from the computer installation and comprising the data and executable codes of a start-up program of the computer installation, and a secured start-up device according to the invention, the secured start-up device being: 1) connected to the computer installation via the first connection interface and to the external data medium unit via the second connection interface, and 2) positioned inline (or in series) between the computer installation and the external data medium unit.

The purpose of the invention is also to provide a secured start-up method for a computer installation comprising a security step of use of data and executable codes which comprises the following steps:

connecting a secured start-up device to the computer installation, connecting an external data medium unit to the secured start-up device, this external data medium unit being separate from the computer installation, and storing the data and executable codes of a start-up program of the computer installation, executing the security step by the secured start-up device, and after the secured start-up device executes the security step, the secured start-up device transmits the start-up program's data and executable codes from the external data medium unit to the computer installation to start-up the computer installation using the transmitted data and executable codes.

Optionally, a method according to the teachings of the present invention includes a security step for suspending the computer installation's start-up process when the secured start-up device sends a hold command to the computer installation, for as long as the step for securing has not been executed by the secured start-up device.

Optionally, the security step comprises a step for verifying and validating access rights by executing a method of authentication of a user of the external data medium unit.

Optionally, the security step comprises a cryptographic step or encryption step for securing the data and executable codes of the start-up program.

Optionally, the cryptographic security step includes the execution of a method for verifying the integrity of data and executable codes of the start-up program.

Optionally, the cryptographic security step comprises the execution of a method for decrypting the data and executable codes of the start-up program.

BRIEF DESCRIPTION OF THE SEVERAL VIEWS OF THE DRAWING

In accordance with the teachings of the present invention an illustrated embodiment of the invention may include

DETAILED DESCRIPTION OF THE INVENTION

Figure 1:
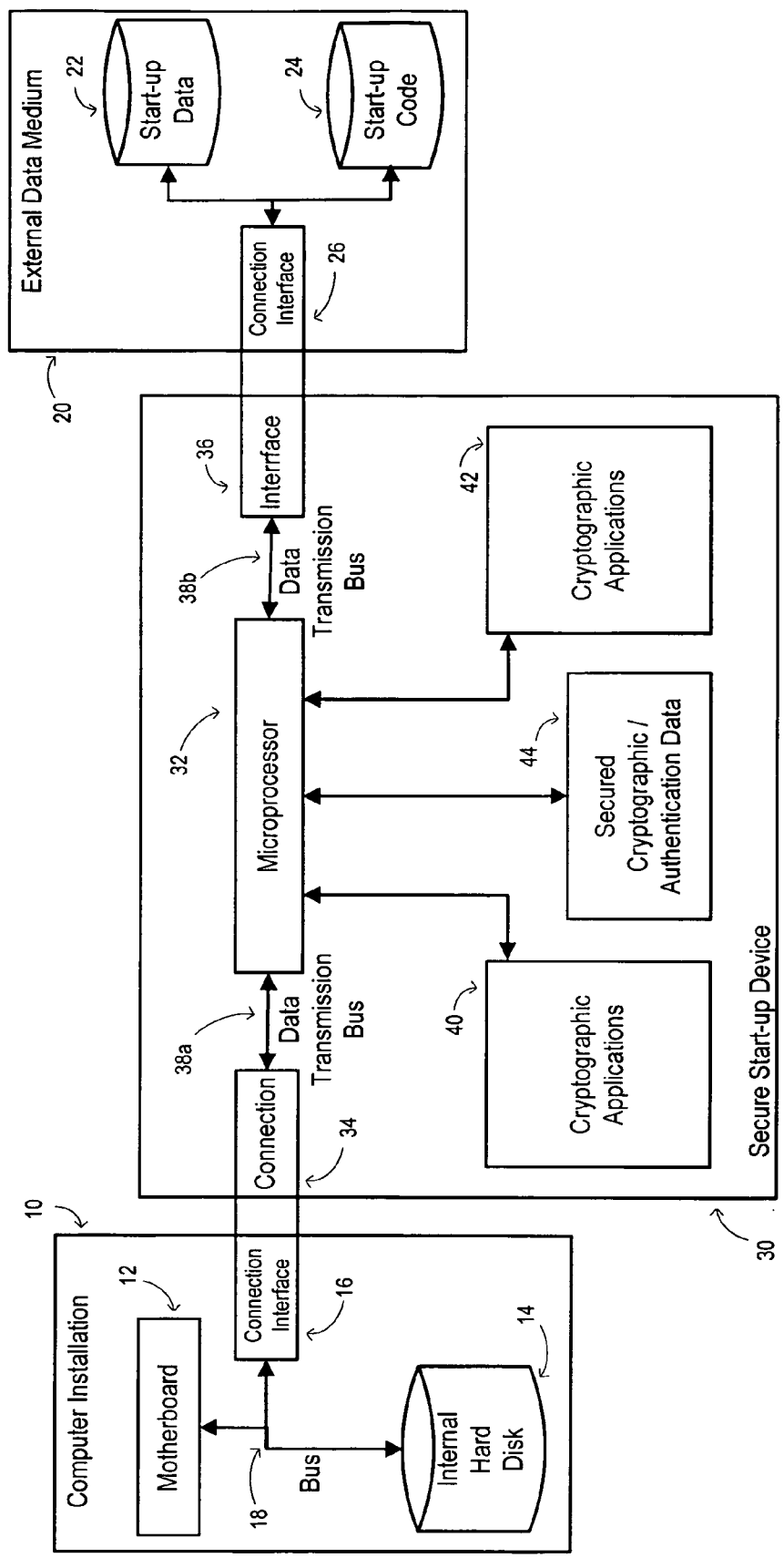
FIG. 1 illustrates a Secured start-up Device connected as an intermediary between a Computer Installation and an External Data Medium.
Figure 2:
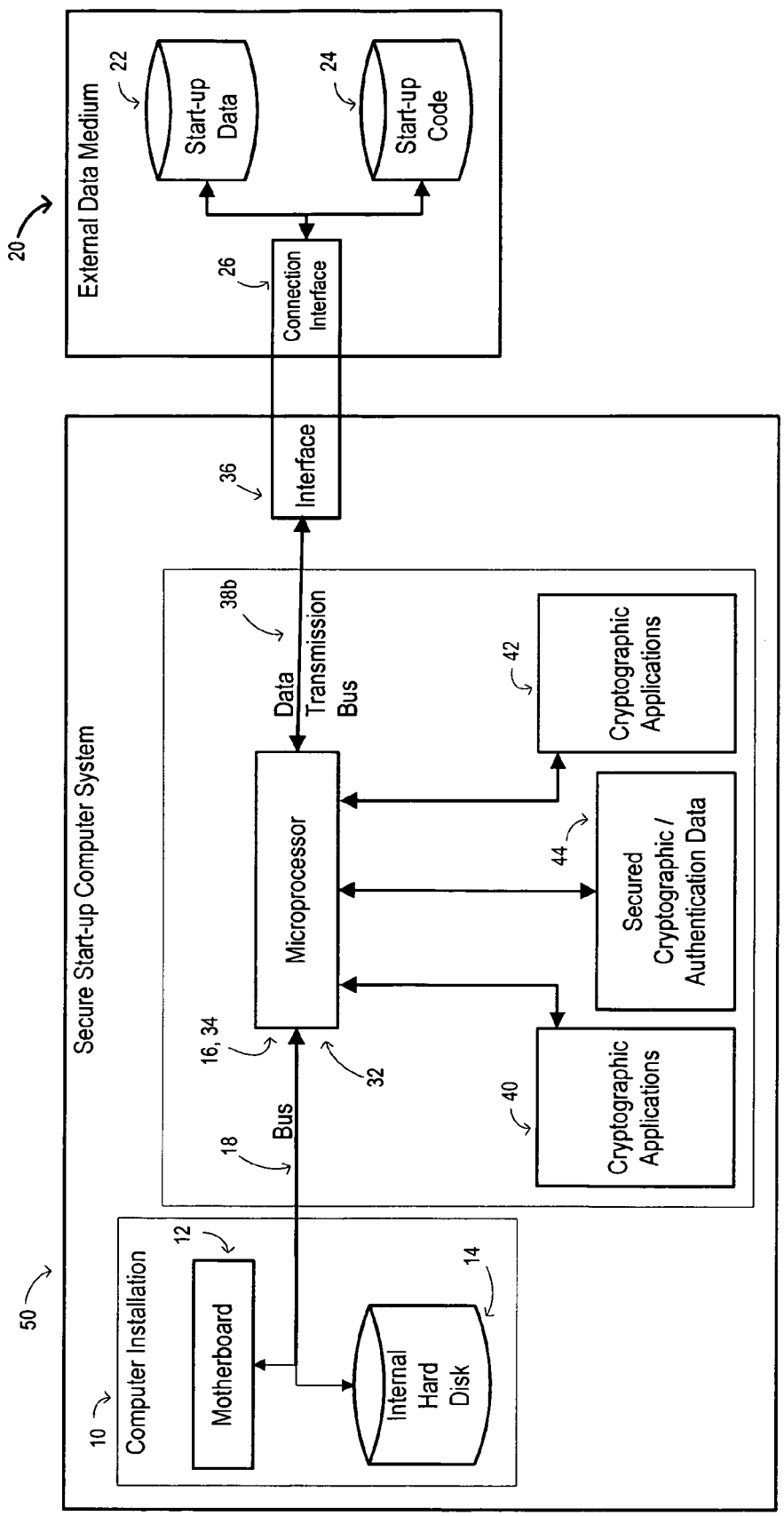
FIG. 2 illustrates a Secured start-up computer system incorporating a Computer Installation and a Secured start-up Device and connected to an External Data Medium.
Figure 3:
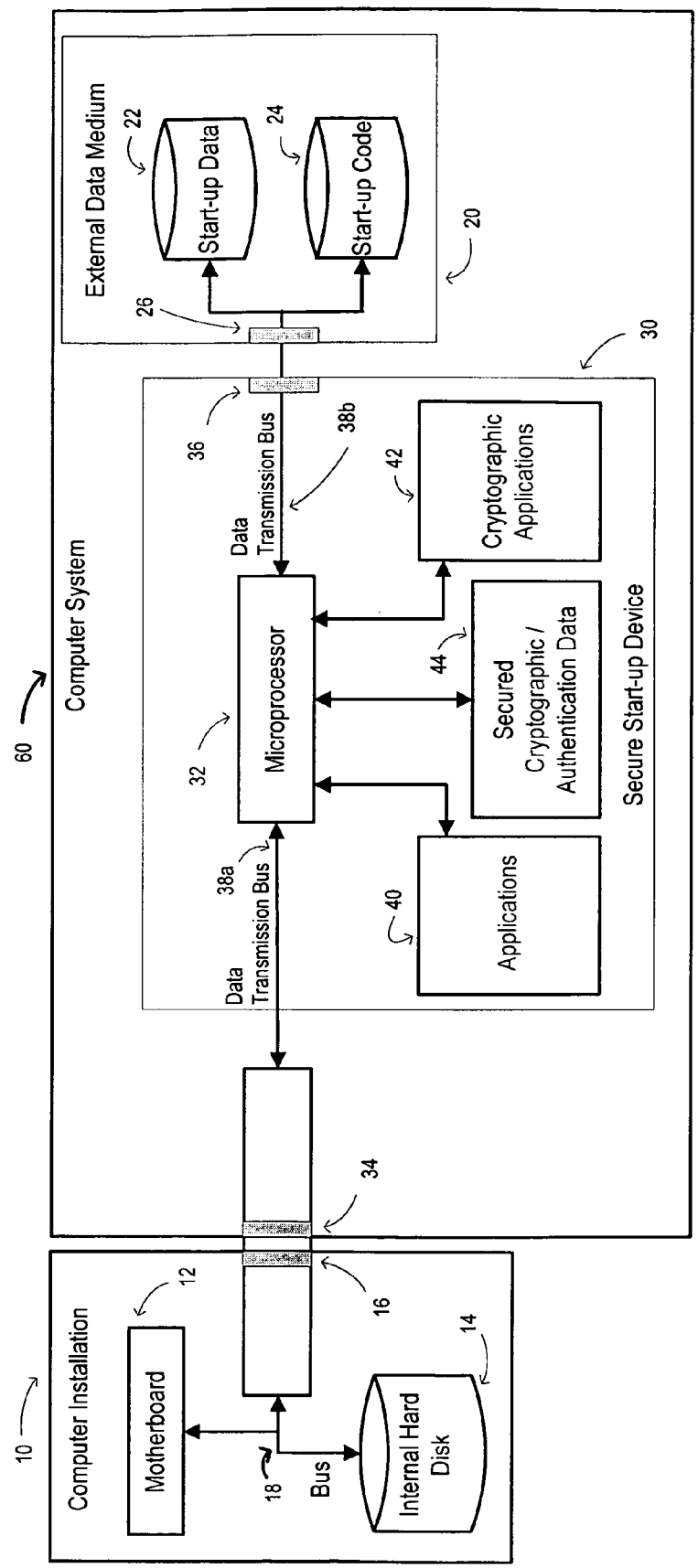
FIG. 3 illustrates a Computer Installation connected to a Computer System, the Computer System comprising a Secured start-up Device connected to an External Data Medium; and, FIG. 4 illustrates the steps of a method according to one illustrated embodiment of the present invention for start-up of a computer system in which a security step must be applied by a security device before start-up of the computer system is allowed to proceed with the security device serving as an intermediary between the computer system and an external data medium.
Figure 4:
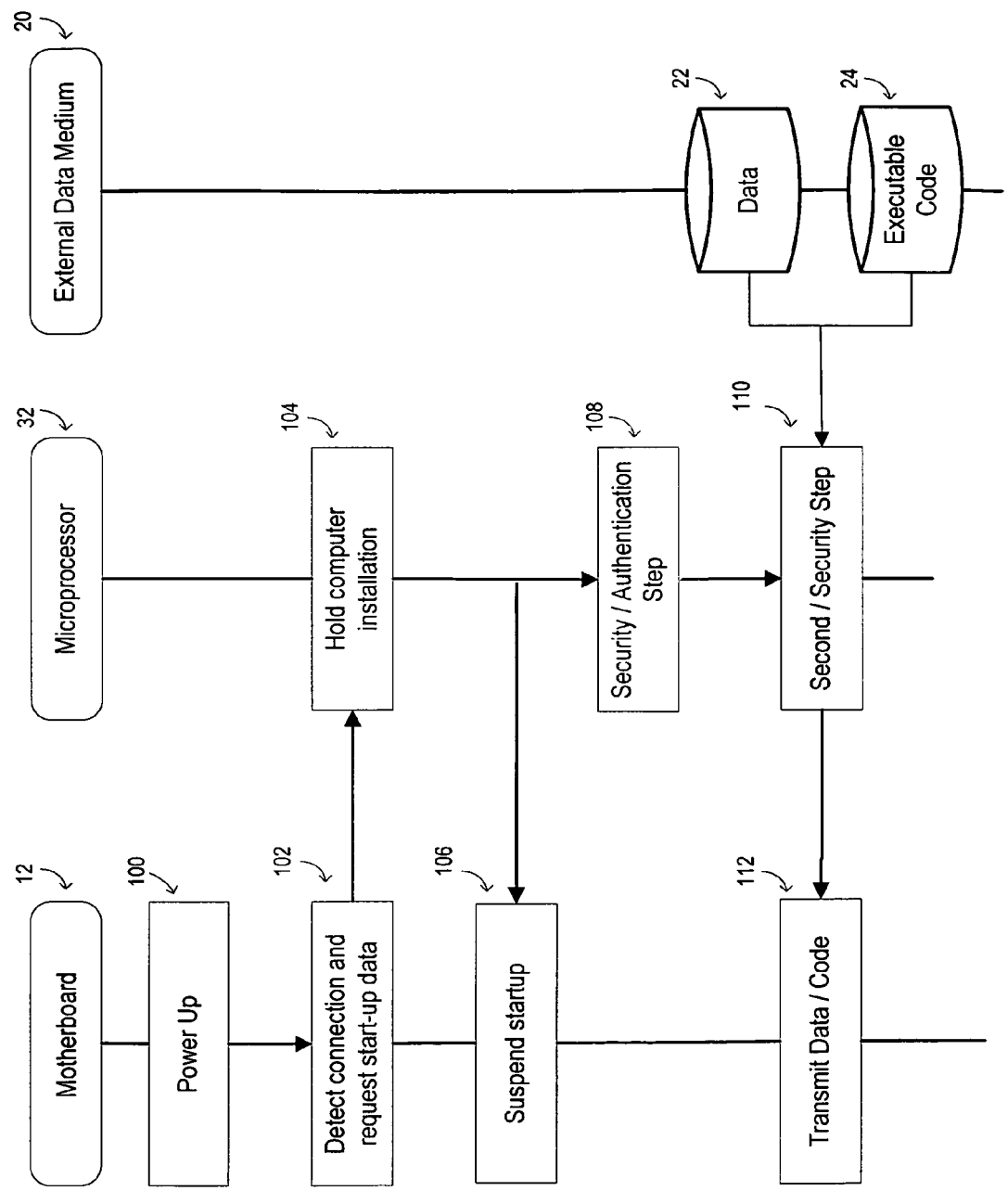

The invention will be better understood by means of the following description, given only as an example and in reference to the attached drawings, wherein:

FIG. 1, FIG. 2, and FIG. 3 respectively represent the general structures of the first, second, and third illustrated embodiments of a computer system constructed according to the invention, for the secured start-up of a computer installation, and FIG. 4 illustrates the successive steps of an embodiment of a method for the secured start-up of a computer installation according to the teachings of the present invention.

In FIG. 1, a computer installation is represented by the general reference number 10. This installation 10 notably comprises a motherboard 12, an internal hard disk device 14, and a connection interface 16 allowing connection to an external device. These three elements/components 12, 14, and 16 are interconnected by a bus 18 as typical for standard data transmission. Also in a standard manner, the motherboard 12 is constructed to include a microprocessor, a ROM memory (not shown) for storing the computer installation's BIOS (not shown), and a RAM memory (not shown), in combination with the microprocessor, to execute programs, notably including a start-up program for the computer installation 10. As an example, such a start-up program may be stored by default on the computer installation's internal hard disk device 14.

This installation 10 is appropriate to implement the invention, but there are also other possible configurations suitable for computer installations that may also be adapted to the invention. Indeed, the invention fully applies, in a non-limiting manner, to computer installations such as desktop and portable PCs, servers, multiprocessor systems, local computer networks, etc.

An external data medium unit 20, separate from the computer installation 10 and not directly connected to it is also shown in FIG. 1. The unit 20 includes data 22 and executable codes 24 of a start-up program of the computer installation 10. Each of these items of the data 22 and executable codes 24 can be stored in encrypted form with an associated signature, in accordance with standard cryptographic methods. The external data medium unit 20 further includes a connection interface 26 providing for connection of the data medium unit to an external device. The data medium unit can take the form of, for example, a USB type key or even an external hard disk device with a USB connection, in which case the connection interface 26 is a USB port or a USB socket.

Finally, a secured start-up device 30 of the computer installation 10 is also shown in FIG. 1. This device 30 is, for example, embodied as a system-on-chip, with security functionalities for using data and executable codes and data transmission functionalities. The security functionalities for using the data and executable codes may include functionalities for verification and validation of a user's access rights as well as cryptographic functionalities for securing the data and codes themselves.

For this, the device 30 includes a microprocessor 32, two interfaces 34 and 36 connected to the microprocessor 32 by two data transmission buses 38a and 38b, storage means 40 for storing executable applications for sending and receiving data, storage means 42 for storing cryptographic executable applications and/or executable applications for securing data and executable code and for verifying and validating access rights, and storage means 44 for securely storing secret cryptographic and/or authentication data. The microprocessor 32, which has its own secure operating system, is configured to perform the following operations, in conjunction with the means 40, 42, and 44:

executing a step for securing the use of data and executable codes comprising at least one of the following substeps:
verifying and validating access rights by user authentication, using means 42 and 44,
decrypting data and executable codes, if necessary, using means 42 and 44,
verifying signatures, if necessary, using means 42 and 44,
managing data transmissions between the first connection interface 34 to the computer installation 10 and the second connection interface 36 to the external data medium unit 20, using means 40 for transmitting data 22 and executable codes 24 of the start-up program stored in the external data medium unit 20, from the external data medium unit 20 via the second connection interface 36 to the computer installation 10 via the first connection interface 34, after executing the security step, by verifying and validating access rights, on the one hand, and cryptographically securing the data 22 and executable codes 24, on the other, for starting up the computer installation 10 using the transmitted data 22 and executable codes, and suspending the start-up of the computer installation 10 as long as the security step has not been executed (and with positive results of validation, verification, decryption, or other application of security).

It will be noted that the microprocessor 32, associated with the means 40, 42, and 44, allows the secured start-up device 30 to operate autonomously to secure and transmit the data and executable codes of the start-up program. It is notably fully independent of the resources of the computer installation 10. The motherboard 12 is indeed only called upon for starting the computer installation using the data and executable codes of the start-up program, after they have been transmitted and possibly decrypted by the secured start-up device 30.

In the exemplary embodiment shown in FIG. 1, the computer installation 10, the secured start-up device 30, and the external data medium unit 20 represent three separate components that can be connected or disconnected easily via the interfaces 16, 34, 36, and 26. As mentioned above, interfaces 36 and 26 are, for example, USB-compatible type ports and/or sockets. The same may be true for the interfaces 16 and 34. After connecting these three devices 10, 20, and 30, the secured start-up device 30 comes between the computer installation 10 and the external data medium unit 20, and forms an inline connection, to perform start-up of the computer installation 10. In this embodiment, the secured start-up device 30 can take the form of a VHDL block of an ASIC ("Application Specific Integrated Circuit") type component or of an independent FPGA ("Field Programmable Gate Array") or FPGA type network.

In another embodiment, represented in FIG. 2, the secured start-up device 30 is integrated, with the computer installation 10, into a secured start-up computer system 50. In this embodiment, the secured start-up device 30 can take the form of a VHDL block of an ASIC component type or an FPGA type network of logical programmable gates, inserted or positioned inline between the second connection interface 36 to the external data medium unit 20 and the data transmission bus 18 of the computer installation 10. The first connection interface 34 from the secured start-up device 30 to the computer installation then forms an access point to the bus 18 of the microprocessor 32 of the secured start-up device 30.

Finally, in another embodiment represented in FIG. 3, the secure-start-up device 30 is integrated with the external data medium unit 20, in a secured start-up computer system 60. In this embodiment, the external data medium unit 20 can be connected directly to the data transmission bus 38b of the secured start-up device 30, said device being able to take the form of a VHDL block of an ASIC type component or an FPGA type component or network of logical programmable gates inserted or positioned inline between the external data medium unit 20 and the first connection interface 34 of the computer installation's secured start-up device 30. In this case, interfaces 16 and 34 can take the form of matching USB ports and/or sockets. The second connection interface 36 of the secured start-up device 30 to the external data medium unit 20 takes the form of an access point of the external data medium unit to the bus 38b.

The security functionalities of the secured start-up device 30 include one or more of the standard cryptographic or encryption functions, particularly confidentiality, integrity, and authentication.

Confidentiality relates to the exchange of encrypted messages between entities, which are unintelligible without a decryption key. This confidentiality is maintained by the application of symmetric (i.e. secret key) or asymmetric (i.e., private-public key pair) encryption schema algorithms. To provide this functionality, the secured start-up device 30 must store the key(s) necessary for encryption and decryption in the means for secured storage 44 and the corresponding encryption algorithm(s) in the application storage means 42. This functionality applies to the data 22 and executable codes 24, possibly using different keys and algorithms.

Integrity relates to the verification that a received message has not been modified by a third party or a malicious system. This integrity is managed using secret key hash functions, called HMAC (Keyed-Hash Message Authentication Code) functions, or using public key signature schemas. Likewise, to provide this functionality, the secured start-up device 30 must store the key(s) necessary to the verification of a signature in the means for secured storage 44 and the corresponding signature generation and/or verification algorithm(s) in the application storage means 42. This functionality applies to the data 22 and executable codes 24, possibly using different algorithms and keys.

Likewise, to provide this functionality, the secured start-up device 30 must store the key(s) needed for verifying a signature in the secure storage means 44 and the corresponding signature verification and/or generation algorithm(s) in the application storage means 42. This functionality applies to the data 22 and executable codes 24, possibly using different keys and algorithms.

Authentication relates to the recognition of a person using a secret that only that person possesses. The secret may be a code or password, but it can also comprise biometric data. Several authentication protocols exist: some simply consist in comparing an entered secret with a model stored in a secured manner, others combine authentication and confidentiality or integrity, while others are of the zero-disclosure type. To provide this functionality, the secured start-up device 30 must possibly store a model in the means for secured storage 44 and the authentication protocol used in the application storage means 42. It must also comprise the means for entering the secret, as for example an alphanumeric keyboard or a biometric sensor (not shown in FIGS. 1 to 3). This functionality is intended, for example, for the owner of the external data medium 20, as a user wishing to perform the start-up of the computer installation 10 using his own start-up program and the associated data 22 and executable codes 24.

As illustrated in FIGS. 1, 2, and 3, the application storage means 42, on the one hand, and the means for secured storage 44, on the other hand, are presented as a possible architecture for implementing securing functionalities for a use of the data 22 and executable codes 24, but other architectures are also possible: notably the supply of more independent storage media and of different types, each adapted to one or more functions among the aforementioned encryption functions, possibly partitioned.

Furthermore, as the aforementioned functions implement algorithms based on encryption keys, algorithms for generating random numbers, for generating encryption keys, for maintaining the integrity of the keys generated and others can be provided for in the secured start-up device 30 and executed by the microprocessor 32 and the associated storage means.

Finally, interfaces 16, 26, 34, and 36 have been described by way of example as being of the USB type or with direct access to a data transmission bus. More generally, these interfaces can be of a parallel (processor bus, PCMCIA, etc.), serial (USB, PCI-X, etc.), or wireless (wireless USB, etc.) type.

The implementation, by one of the previously described systems, of an embodiment of a method for starting up the computer installation 10 according to the invention will now be described, in reference to FIG. 4.

During a first step 100, the computer installation 10 is powered up, which triggers the execution of the BIOS of the motherboard 12. In a standard manner, the BIOS starts by testing, declaring and configuring the different components and peripheral devices of the computer installation 10, then searches for a start-up program and an associated operating system before launching it, in accordance with a predefined start-up strategy.

During a next step 102, the BIOS of the motherboard 12 detects the connection of the secured start-up device 30 to the interface 16 of the computer installation 10. During this step, it requests the transmission of the data and executable codes of a start-up program to the secured start-up device 30.

Then, during a step 104, the microprocessor 32 of the secured start-up device 30, receives this request and generates a hold instruction of the start-up of the computer installation 10 as long as it has not secured the use of the data 22 and executable codes 24 of the external data medium 20 connected via the second interface 36.

This step 104 is followed by a step 106 during which the microprocessor of the motherboard 12 suspends the start-up of the computer installation 10.

This step 104 is also followed by an authentication step 108, including a first step for securing the use of the data 22 and executable codes 24 so as to ensure that the user wishing to start-up the computer installation 10 actually has access rights to the data 22 and executable codes 24 stored in the external data medium unit 20. This step requires the entry of a secret (code, password, or biometric data) by the user via a dedicated interface of the secured start-up device 30.

Following step 108 a step 110 is reached, which constitutes a second step for securing the use of the data 22 and executable codes 24. During this step, the data 22 and executable codes 24 stored in the external data medium unit 20 are processed by the microprocessor 32, using cryptographic or encryption data and functions stored in the storage means 42 and 44, to be decrypted and/or validated in terms of integrity before being transmitted to the microprocessor of the motherboard 12 of the computer installation 10.

The transmission, by the start-up device, of the decrypted data 22 and executable codes 24 to the computer installation 10 is only performed if the steps 108 and 110 have been completed successfully. A function of the secured start-up device 30 is indeed to come between the computer installation 10 and the external data medium 20 in order to perform the securing of the use of the data 22 and executable codes 24 and to send the latter (i.e. the data 22 and executable codes 24) to the computer installation only on the condition that the securing has been performed by the secured start-up device 30, by verification and validation of the access rights of the user, on the one hand, and by securing by encryption the data 22 and executable codes 24 themselves, on the other hand.

When the access rights are validated, when the integrity of the data and executable codes is verified and they are decrypted, a last step 112 is reached for transmitting the decrypted data 22 and executable codes 24 to the computer installation 10 and continuing to start up the computer installation 10 on the basis of the data 22 and executable codes 24 transmitted. This start-up is performed by the microprocessor on the motherboard 12.

The operation of the start-up device 30 has just been described in its current use, for the start-up of the computer installation 10 by a user on the basis of data and executable codes specific to this user.

In another illustrated embodiment, the start-up device 30 can also be designed to have an "administrator" mode, as an alternative to the previously described "user" mode. An administrator is a special user having additional rights and who must therefore be identified using specific data. In the administrator mode, it may be possible to define the size of the authentication data, the cryptographic mechanisms used, the number of partitions and attributes of the storage means, the various user authorizations, the authentication protocol used, and the right of a user to modify the configuration of the partitions, etc.

It clearly appears that the previously described start-up method or device enables a customized start-up for a computer installation 10, after the protection of the use of data and executable codes is carried out independently from the resources of the computer installation. It is sufficient for the BIOS of this computer installation to give priority to a start-up based on the data and executable codes stored in an external device, which is generally the case for any correctly configured BIOS. The secured start-up device is then responsible for the verifying and validating steps of the access rights, then the step of verifying the integrity and transmitting the decrypted data and executable codes. Hence, a user can supply his or her own data medium on his or her person and start-up any computer installation with all of his or her data set, being assured of a security of integrity and confidentiality in the use of these data and executable codes.

Finally, it is noted that the invention is not limited to the previously described illustrated embodiments. In fact, diverse variations or variants can be made to the structure of the implemented computer system, whether at the level of the computer installation, the secured start-up device, or the external data medium unit. Diverse variations can also be made to the implemented method, notably in the choice and sequence of the cryptographic algorithms used.

Having now described the preferred embodiments of the invention, it will become apparent to one of skill in the arts that other embodiments incorporating the concepts may be used. It is felt, therefore, that these embodiments should not be limited to the disclosed embodiments but rather should be limited only by the spirit and scope of the following claims.

We claim the following:

1. A secured start-up device facilitating exchange of data between a computer installation and an external non-transitory storage medium located separate from the computer installation, the external non-transitory storage medium providing authentication data and executable codes of a start-up program used to enable start-up of the computer installation, the secured start-up device comprising: a) a primary connection interface connectable to the computer installation; b) a second connection interface connectable to the external non-transitory storage medium; c) the secured startup device accessing and applying at least one of a number of predefined security measures for access to the authentication data and executable codes of the start-up program accessible from the non-transitory storage medium through the second connection interface, and wherein access rights for a user of the non-transitory storage medium are stored on the non-transitory storage medium; d) the secured startup device transmitting, from the second connection interface to the primary connection interface, executable codes of the start-up program from the non-transitory storage medium after the application of the at least one of a number of predefined security measures to enable startup of the computer installation.

2. The secured start-up device of a computer installation according to claim 1, wherein the one of a number of predefined security measures includes a cryptographic means for maintaining the security of the authentication data and executable codes of the start-up program.

3. The secured start-up device of a computer installation according to claim 2, wherein the one of a number of predefined security measures includes means for executing a method for verifying the integrity of the authentication data and executable codes of the start-up program.

4. The secured start-up device of a computer installation according to claim 2, wherein the one of a number of predefined security measures further includes executing a method for decrypting the authentication data or executable codes of the start-up program.

5. The secured start-up device of a computer installation according to claim 2, wherein the one of a number of predefined security measures further includes encryption of the authentication data or executable codes of the start-up program.

6. A computer system with secured start-up comprising: a) a computer; and b) a secured start-up device providing for exchange of data between the computer and an external non-transitory storage medium unit, the secured start-up device located and connectable in series between the computer and the external non-transitory storage medium unit, the external non-transitory storage medium unit being separate from the computer, the external non-transitory storage medium unit containing authentication data and executable codes of a start-up program to be used in start-up of the computer, the secured start-up device comprising: 1) a primary connection interface connectable to the computer; 2) a second connection interface connectable to the external non-transitory storage medium unit; 3) the secured startup device accessing and applying at least one of a number of security measures, in access of the authentication data and executable codes of the start-up program, accessible from the non-transitory storage medium through the second connection interface and wherein access rights for a user of the non-transitory storage medium are stored on the non-transitory storage medium; 4) the secured startup device transmitting the executable codes of the start-up program from the external non-transitory storage medium unit to the computer through the primary connection interface to enable startup of the computer.

7. A computer system with secured start-up according to claim 6, wherein the primary connection interface is an access point to a digital data transmission bus of the computer installation.

8. A computer system for connection to a computer installation comprising: a) an external non-transitory storage medium unit separate from the computer installation; and b) a secured start-up device for exchange of data between the computer installation and the external non-transitory storage medium unit, the external non-transitory storage medium unit containing authentication data and executable codes of a start-up program to be used in start-up of the computer installation, the secured start-up device comprising: 1) a primary connection interface connectable to the computer installation; 2) a second connection interface connectable to the external non-transitory storage medium unit; 3) the secured startup device accessing and applying at least one of a number of predefined security measures for access to the authentication data and executable codes of the start-up program, accessible from the non-transitory storage medium through the second connection interface; 4) the secured startup device transmitting the executable codes of the start-up program from the external non-transitory storage medium unit to the computer installation through the primary connection interface to enable startup of the computer installation.

9. A computer system with a secured start-up of a computer installation according to claim 8, wherein the second connection interface is an access point to a digital data transmission bus of the external data medium unit.

10. A secured start-up method of a computer installation for securing use of-authentication data and executable codes of a start-up program stored on an external non-transitory storage medium unit separate from the computer installation, the secured start-up method comprising the steps of: a) connecting a secured start-up device to the computer installation, b) connecting the external non-transitory storage medium unit to the secured start-up device; c) executing on the secured start-up device at least one security step; d) suspending the computer installation start-up process when the secured start-up device sends a hold command to the computer installation, and maintaining the suspending of the computer installation start-up as long as the secured start-up device has not successfully completed the at least one security step; and e) after the secured start-up device completes successful execution of the at least one security step, the secured start-up device transmitting the executable codes of the start-up program from the external non-transitory storage medium unit to the computer installation for the start-up of the computer installation.

11. The secured start-up method of a computer installation according to claim 10, wherein the security step includes a step of verifying and validating access rights by executing a method of authentication of a user of the external non-transitory storage medium unit.

12. The secured start-up method of a computer installation according claim 11, wherein the security step comprises a cryptographic step for securing the authentication data and executable codes of the start-up program.

13. The secured start-up method of a computer installation according to claim 12, wherein the cryptographic security step comprises a step of executing a method for verifying integrity of the authentication data and executable codes of the start-up program.

14. The secured start-up method of a computer installation according to claim 12, wherein the cryptographic security step comprises a step of executing a method for decrypting the authentication data and executable codes of the start-up program.

* * * * *